(12) United States Patent
Ueda

(10) Patent No.: US 6,459,523 B2
(45) Date of Patent: Oct. 1, 2002

(54) GALVANO-MICROMIRROR AND ITS MANUFACTURE PROCESS

(75) Inventor: Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 34 days.

(21) Appl. No.: 09/746,291

(22) Filed: Dec. 20, 2000

(30) Foreign Application Priority Data

Mar. 3, 2000 (JP) ........................................ 2000-059268

(51) Int. Cl.⁷ .............................................. G02B 26/00
(52) U.S. Cl. .......................... 359/290; 359/291; 359/295
(58) Field of Search ................................ 359/290–292, 359/295, 214, 224, 230; 310/306, 307; 250/231.1, 231.18

(56) References Cited

U.S. PATENT DOCUMENTS

| 5,737,302 A | * | 4/1998 | Kasahara | 369/118 |
| 5,999,303 A | * | 12/1999 | Drake | 359/224 |
| 6,232,861 B1 | * | 5/2001 | Asada | 335/222 |

FOREIGN PATENT DOCUMENTS

| JP | 57034462 A | 2/1982 |
| JP | 07175005 | 7/1995 |
| JP | 07218857 | 8/1995 |
| JP | 7-287177 | 10/1995 |
| JP | 08211320 | 8/1996 |
| JP | 09146031 | 6/1997 |
| JP | 09-146032 | 6/1997 |
| JP | 09146034 | 6/1997 |
| JP | 10308030 | 11/1998 |
| JP | 11119145 | 4/1999 |
| JP | 11202254 | 7/1999 |

OTHER PUBLICATIONS

Silicon Torsional Scanning Mirror; Kurt E. Peterson, IBM Journal of Research and Development; vol. 24, No. 5, Sep. 1980.

* cited by examiner

Primary Examiner—Jordan Schwartz
Assistant Examiner—William Choi
(74) Attorney, Agent, or Firm—Greer, Burns & Crain, Ltd.

(57) ABSTRACT

A GALVANO-micromirror includes a first substrate having a light-reflective mirror face on one surface thereof and a first electrode on one or both surface(s) thereof; and a second substrate including a frame-form base, a second electrode located oppositely to the first electrode, a joint holder section located under the mirror face for holding the first substrate, and a torsion bar section located under the mirror face for connecting the frame-form base to the joint holder section and supporting the joint holder section pivotally within a range of angles, wherein a part of a surface of the first substrate on which the mirror face is not formed is joined to the joint holder section of the second substrate.

4 Claims, 17 Drawing Sheets

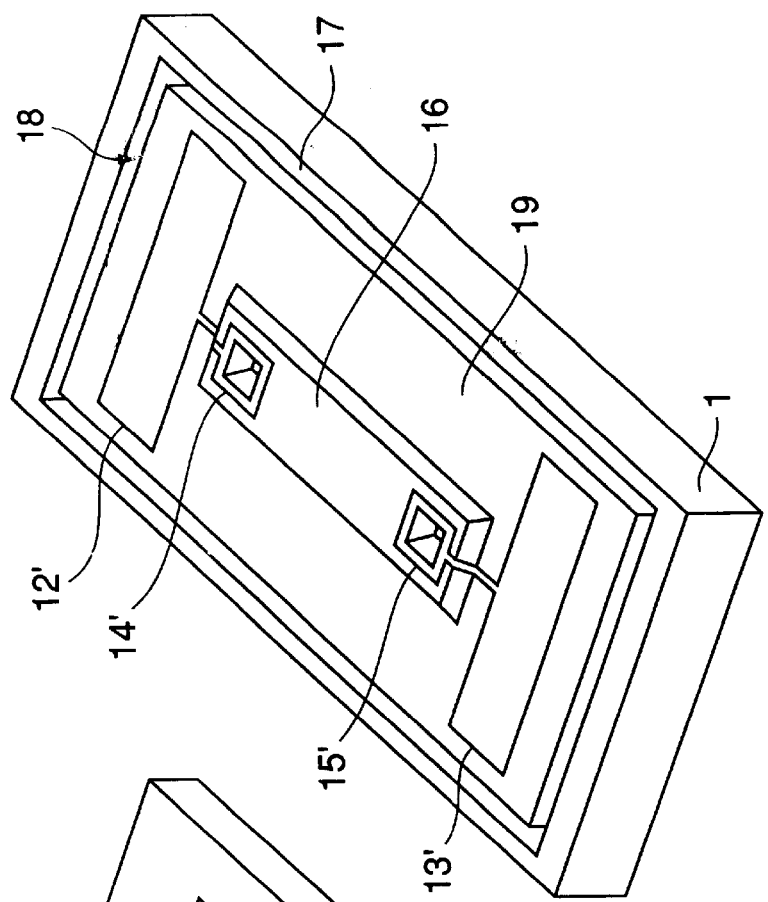
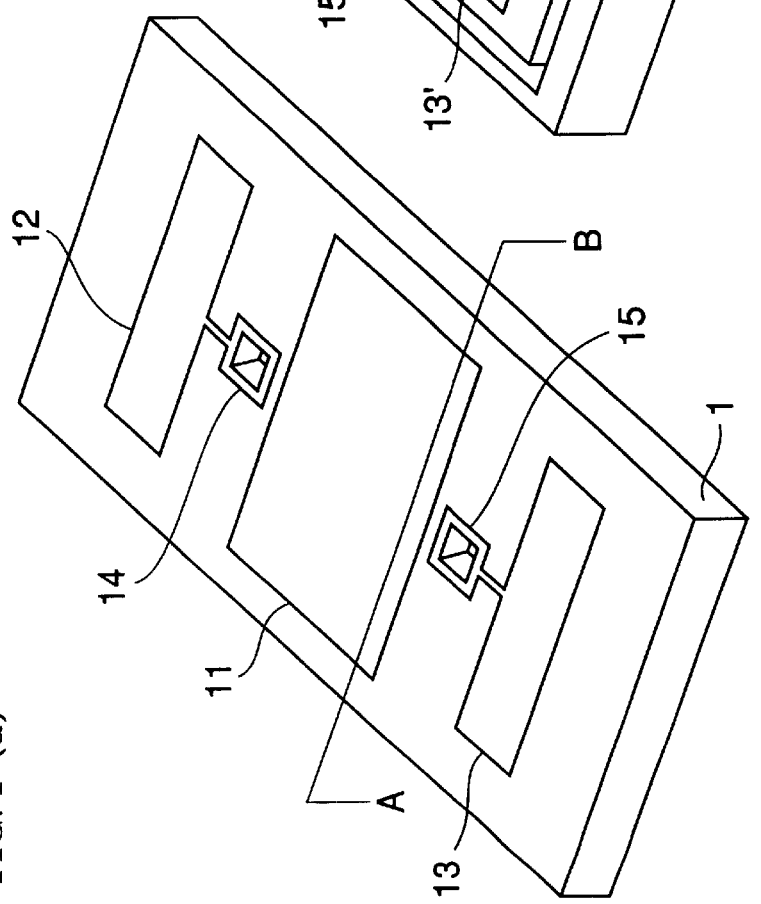

A−B SECTION

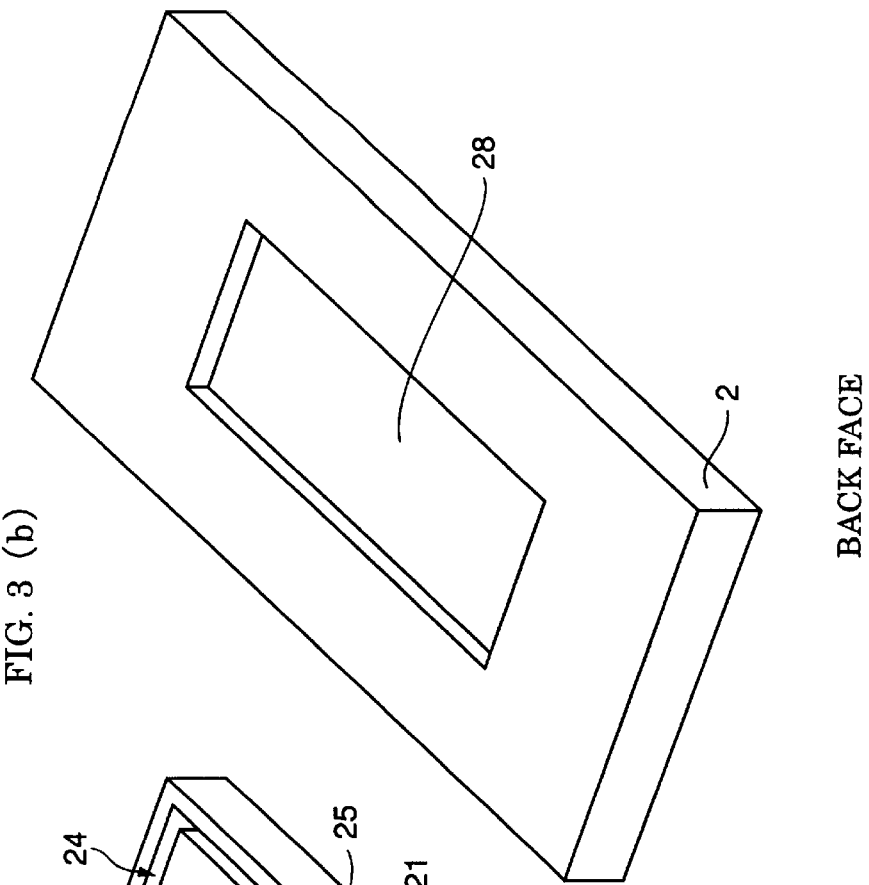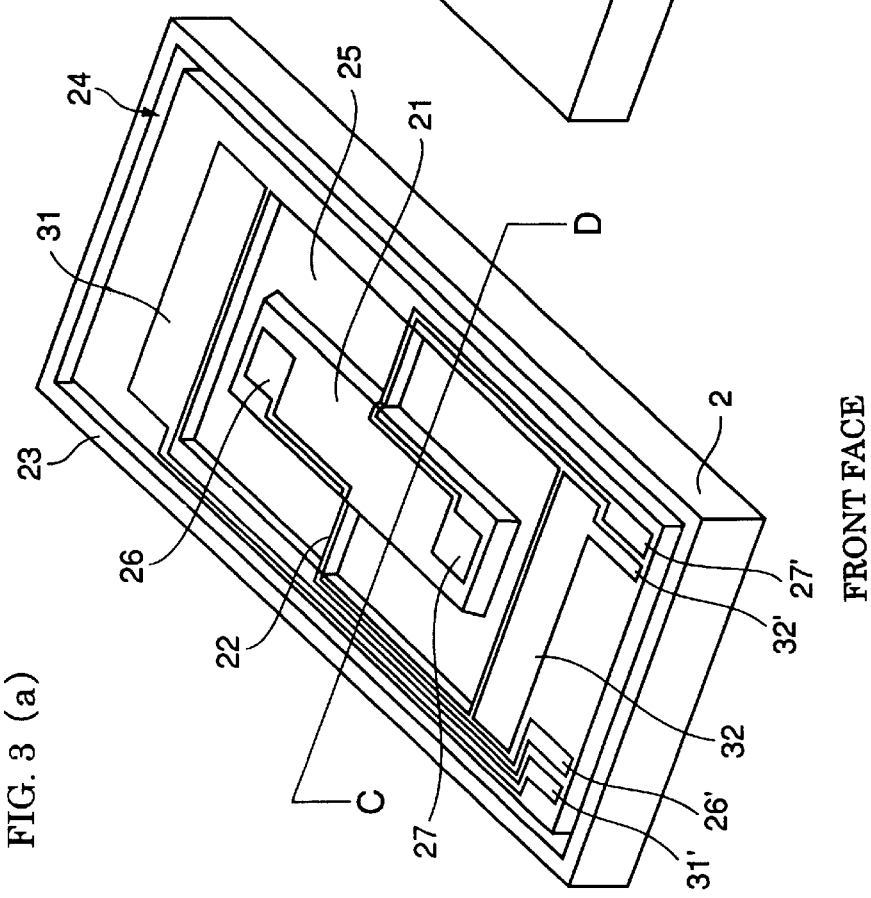

C−D SECTION

E−F SECTION

E-F SECTION

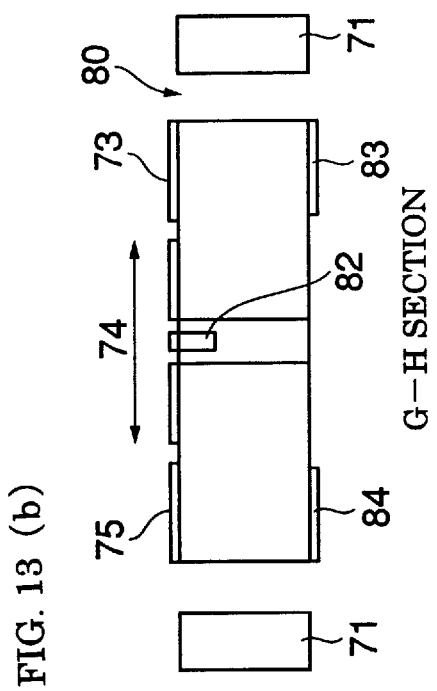
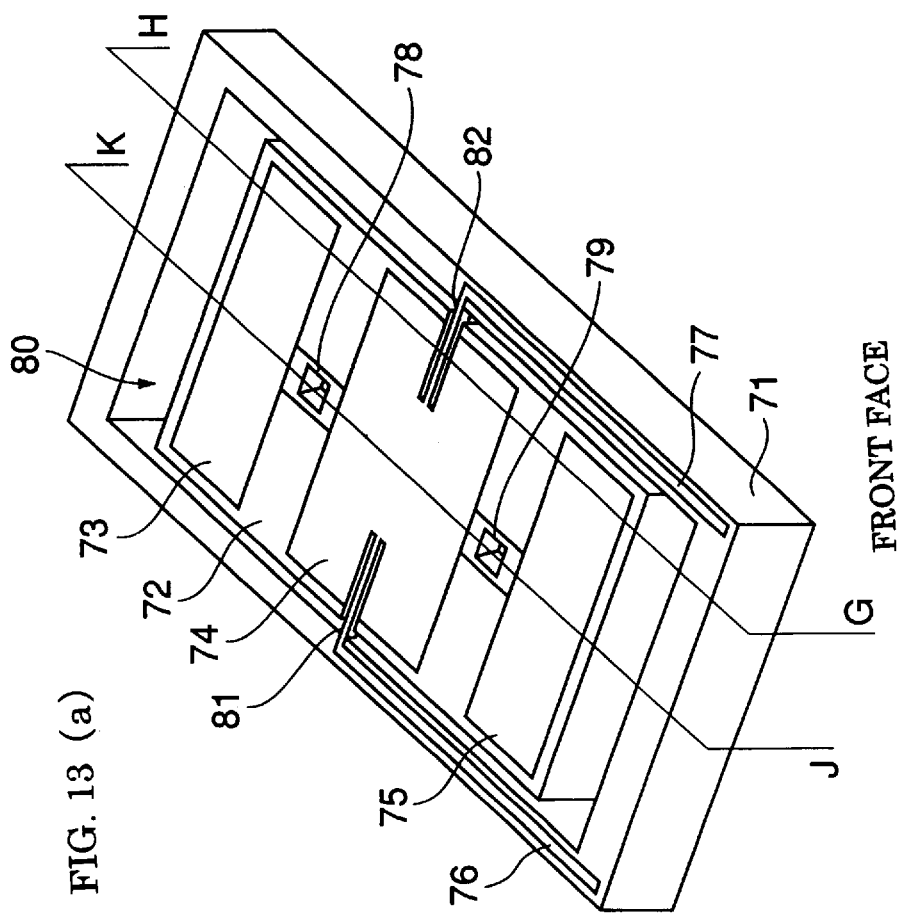
FIG. 13 (b)
FIG. 13 (a)

(J–K SECTION)

(G—H SECTION)

GALVANO-MICROMIRROR AND ITS MANUFACTURE PROCESS

CROSS-REFERENCE TO RELATED APPLICATION

This application is related to Japanese Patent Application No. 2000-059268 filed on Mar. 3, 2000, whose priority is claimed under 35 USC §119, the disclosure of which is incorporated by reference in its entirety.

BACKGROUND OF THE INVENTION

1. Field of the Invention

The present invention relates to a GALVANO-micromirror, particularly a GALVANO-micromirror of an electrostatic actuation type to be used to control a position irradiated by a light beam in an optical disk driving device, and its manufacture process.

2. Description of Related Art

A currently available usual GALVANO-micromirror of the electrostatic actuation type is disclosed, for example, by Silicon Torsional Scanning Mirror (IBM J.RES. and DEVELOP., Vol. 24, No. 5, September 1980. This GALVANO-micromirror is provided with an electrode substrate 100 and a mirror substrate 102 situated thereon, as shown in FIGS. 16 and 17.

The mirror substrate 102 includes a frame-form base 104, a mirror section 106 having a mirror face 106a formed on one main surface thereof, torsion bar sections 108 connecting the base section 104 to the mirror section 106 and supporting the mirror section 106 pivotally. On the other main surface of the mirror section 106, there is formed a first electrode composed of a pair of electrode plates 110a and 110b. On the electrode substrate 100, there is formed a second electrode composed of a pair of electrode plates 112a and 12b opposing the electrode plates 110a and 110b of the first electrode. On the electrode substrate 100, a linear projection 100a is integrally formed which abuts the mirror section 106 and has a mountain-like cross section. The ridge of the projection 100a extends along the axis of the torsion bar sections 108.

In this GALVANO-micromirror, when voltage is applied across one electrode plate 110a of the first electrode and one electrode plate 112a of the second electrode, the mirror section 106 pivots by electrostatic attraction in an anti-clockwise direction in FIG. 17. When voltage is applied across the other electrode plate 110b of the first electrode and the other electrode plate 112b of the second electrode, the mirror section 106 pivots by electrostatic attraction in a clockwise direction in FIG. 17. Since such electrostatic attraction is proportional to the area of the electrodes, the first electrode comprised of the electrode plates 110a and 110b is formed almost all over the other main surface of the mirror section 106, for allowing actuation by a lower voltage. The size of the electrode plates 112a and 112b of the second electrode is determined according to the size of the electrode plates 110a and 110b of the first electrode.

A GALVANO-micromirror used in an optical disk driving device is disclosed by Japanese Unexamined Patent Publication No. HEI 9(1997)-146034. This GALVANO-micromirror also has the function of oscillating a mirror substrate by electrostatic attraction between an electrode mounted on the mirror substrate and an electrode mounted on the surface of an electrode substrate opposedly to the electrode on the mirror substrate when voltage is applied across the electrodes, like the GALVANO-micromirror shown in FIG. 16.

Micromirrors used in optical disk driving devices are required to have high-performance electric-mechanic operation characteristics and also required in particular to have an excellent flatness and a reduced size in outward form for thinning the optical disk driving devices. For example, a flatness of 0.05λ (λ is wavelength of a light source used) is demanded. For size reduction, the length in a direction defined by linking two torsion bars (a longitudinal direction in FIG. 16) needs to be shortened.

Japanese Unexamined Patent Publication No. HEI 7(1995)-287177 discloses a micromirror in which a torsion bar is mounted under a mirror. This structure is formed using a so-called surface micromachining technique by which thin films are laminated on a substrate while being patterned in desired configuration sequentially by utilizing formation, patterning and removal of sacrificial layers.

However, the current surface micromachining technique can form thin-film mirror structures of several micrometers or more thickness. If a mirror face having a flatness acceptable for the optical disk driving devices is intended to be realized, it is only possible to produce a mirror face of about several hundreds of micrometers in size at the largest.

Generally, the micromirrors used for optical disk driving devices are in the shape of a square or an ellipse of several millimeters and have a primary resonant frequency as low as about 100 to several hundreds Hz. If a micromirror of such size is produced by the surface micromachining technique, there occur curves and distortions in the resulting thin film because of residual stress generated during the production process. Also since the micromirror is a thin-film mirror, distortions occur during operation and the mirror face cannot have a required flatness.

For example, for maintaining a necessary optical flatness sufficiently high with a mirror face of several millimeters square having a metal film of high reflectance or a multi-layered film of dielectric, it is presumed by experience that the thickness of the mirror needs to be about 150 μm at the minimum. Therefore, it is hard to produce a micromirror having a low resonance frequency and a high flatness which can be used for optical disk devices, by the surface micromachining technique using the step of laminating thin films and sacrificial films.

SUMMARY OF THE INVENTION

The present invention provides a GALVANO-micromirror and its production process which realize a miniaturized micromirror having sufficient performance for being used for optical disk driving devices.

The present invention provides a GALVANO-micromirror including a first substrate having a light-reflective mirror face on one surface thereof and a first electrode on one or both surface(s) thereof; and a second substrate including a frame-form base, a second electrode located opposedly to the first electrode, a joint holder section located under the mirror face for holding the first substrate, and a torsion bar section located under the mirror face for connecting the frame-form base to the joint holder section and supporting the joint holder section pivotally within a range of angles, wherein a part of a surface of the first substrate on which the mirror face is not formed is joined to the joint holder section of the second substrate.

With this construction, the GALVANO-micromirror can be reduced in size while maintaining performance required for being used in optical disk driving devices.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1(a) and 1(b) are perspective views of a first substrate of a GALVANO-micromirror in accordance with an embodiment of the present invention;

FIGS. 3(a) and 3(b) are perspective views of a second substrate of a GALVANO-micromirror in accordance with an embodiment of the present invention;

FIGS. 13(a) and 13(b) illustrate the construction of a GALVANO-micromirror in accordance with another embodiment of the present invention;

DESCRIPTION OF THE PREFERRED EMBODIMENTS

Figure 2:
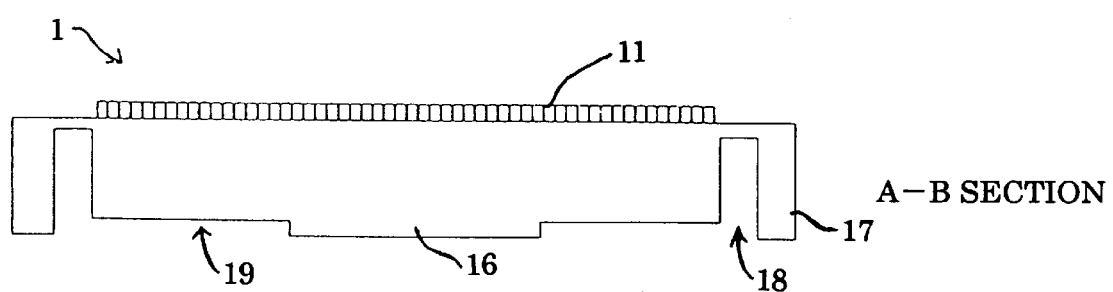
FIG. 2 is a sectional view of the first substrate of FIG. 1 taken along line A-B in FIG. 1.

The present invention also provides a process for manufacturing a GALVANO-micromirror including the steps of: forming a mirror face of a light-reflective film on one surface of a first substrate made of a semiconductor bulk substrate, a first electrode of a metal thin film on one surface or first electrodes of thin metal films on both surfaces of the first substrate, and a joint section in a protrusive form on a surface on which the mirror face is not formed; forming, on one surface of a second substrate made of a semiconductor bulk substrate, a second electrode opposed to the first electrode(s), a joint holder section in a protrusive form for holding the first substrate, and a torsion bar section for pivotally supporting the joint holder section within a range of angles; and joining the first and second substrates so that the joint section of the first substrate contacts the joint holder section of the second substrate. Here, components including the mirror face, electrodes and the like can be formed on the surface of the semiconductor bulk substrate using a bulk micromachining technique. With this construction, it is possible to produce a micromirror having a thick mirror substrate by the bulk micromachining technique, and consequently to provide a micromirror having good flatness.

In the present invention, the bulk micromachining technique means a method of forming a desired configuration on a semiconductor bulk substrate by etching the substrate several times. The technique also includes the formation and patterning of thin films necessary for forming the electrodes and mirror face in addition to etching. The currently used surface micromachining technique is a method of forming a desired structure by sequentially forming and patterning thin films and sacrificial layers on a semiconductor substrate. On the other hand, the bulk micromachining technique does not include the step of forming sacrificial layers but forms thin films and patterns them in a desired configuration on the bulk substrate through etching the bulk substrate. While the substrate is not patterned by the surface micromachining technique, the substrate itself is patterned by the bulk micromachining technique.

For example, in order to form a protrusion of predetermined configuration on a bulk substrate, a resist film is formed on a region to be the protrusion and the bulk substrate in other region where the resist film is not formed is etched in a predetermined etch amount under predetermined conditions. Thus, the GALVANO-micromirror of the present invention is characterized in that its main constitutional elements are formed by the bulk micromachining technique.

The present invention is also characterized in that a peripheral frame and a separation trench for separating the peripheral frame from the first substrate are formed on a surface of the semiconductor bulk substrate forming the first substrate on which surface the mirror face is not formed; a peripheral frame and a separation trench corresponding to the peripheral frame and the separation trench formed on the first substrate are formed on the surface of the semiconductor bulk substrate forming the second substrate on which surface the joint holder section is formed; and, after the first and second substrates are joined, the trenches are bored through by etching, thereby separating the substrates from the peripheral frames.

Further, the present invention is characterized in that, in the case where the first electrodes are formed on both surfaces of the first substrate, a through hole is formed in the first substrate for electrical connection of the electrodes on both surfaces.

The present invention also provides a GALVANO-micromirror including a frame-form base, a mirror section located inside the base which has, on one surface thereof, a mirror face and an electrode for electrostatic actuation, and two torsion bar sections for connecting the base to the mirror section and supporting the mirror section pivotally within a range of angles, wherein recesses are formed in a part of the mirror face, and the torsion bar sections are arranged in the recesses so as to connect edges of the recesses in the mirror face to parts of the base.

With this construction, the GALVANO-micromirror can be constructed of a single substrate.

Further, the present invention provides a process for manufacturing a GALVANO-micromirror comprising the steps of forming a mirror face of a light-reflective film and a first electrode on one surface of a semiconductor bulk substrate; forming, on another surface of the semiconductor bulk substrate, a first trench for separating a mirror section including the mirror face and the first electrode from a frame-form base to be formed in a periphery of the substrate, and a second trench for forming a recess in the mirror face and two torsion bar sections, the second trench being formed under the torsion bar sections and the torsion bar sections being formed within the recess in the mirror face for supporting the mirror face pivotally within a range of angles; boring through the first trench, thereby separating the mirror section from the frame-form base; and boring through the recess in the mirror face so that the mirror section is connected to the frame-form base by the torsion bar sections, wherein the step of separating the mirror section from the frame-form base and the step of boring through the recess in the mirror face are performed by etching.

This etching may be dry etching and wet etching.

Here, the recess may be so formed that the area of the recess formed in the desired position of the mirror face is negligibly small (e.g., about 2%) with respect to the area of the entire mirror face.

Further, dry etching may be used in the step of separating the base from the mirror section by the first separation trench and the step of boring through the recess of the mirror face.

Further, the first electrode may also be formed on another surface of the semiconductor bulk substrate in a position corresponding to the first electrode formed in said one surface, and a through hole is formed for electrical connection of the first electrodes on both the surfaces.

Here, silicon is typically used for the semiconductor bulk substrate, but germanium or glass may also be used though glass is not a semiconductor.

The light-reflective film forming the mirror face is required to have a high light reflectance and good flatness. For example, a film of a metal such as Cr, Au, Al or the like may be used. Besides these metals, a multi-layered dielectric film may be used.

The present invention is now described in detail with reference to embodiments shown in the drawings. However, the embodiments should not be construed to limit the scope of the invention.

Figure 8:
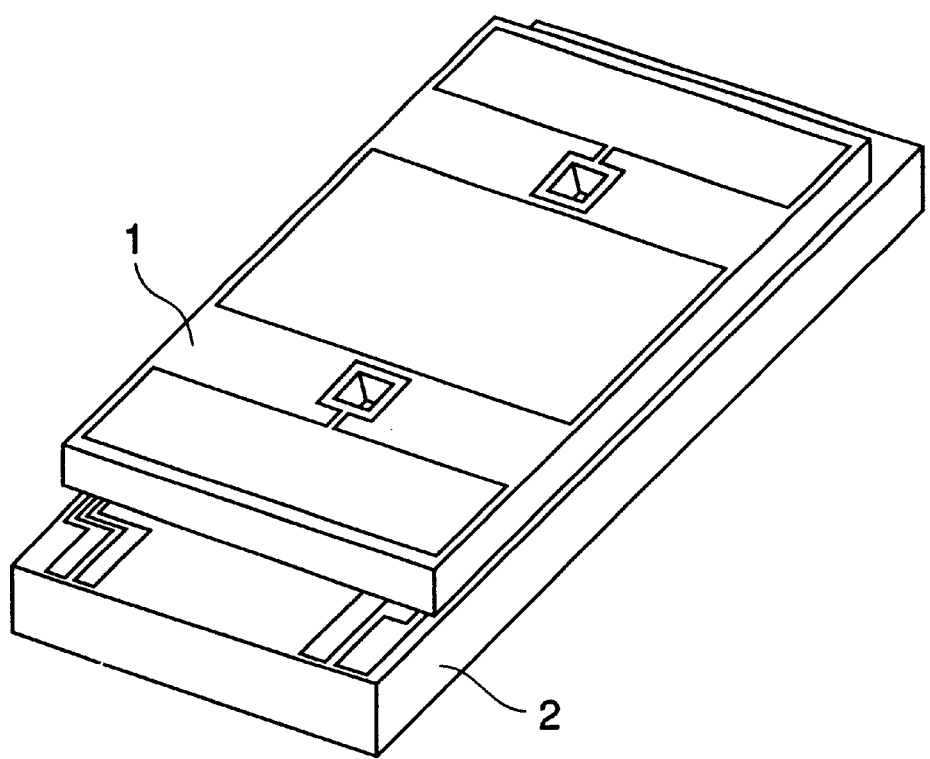
FIG. 8 is a perspective view of a completed GALVANO-micromirror in accordance with an embodiment of the present invention.

An embodiment of the GALVANO-micromirror of the present invention is comprised of a pair of substrates (a first substrate 1 and a second substrate 2). FIGS. 1(a) and 1(b) show perspective views of the first substrate 1 and FIGS. 3(a) and 3(b) show perspective views of the second substrate 2. FIG. 8 shows a completed GALVANO-micromirror in accordance with the embodiment of the present invention which is produced by a manufacture process described later.

The GALVANO-micromirror of the present invention is a micromirror for an optical disk driving device having a structure such that a torsion bar 22 is provided under a mirror face 11 and having the function of reciprocating the mirror face by push and pull operation with control of angle within the range of about ±0.1° An electrode substrate on an upper side is not shown in FIG. 8.

In this embodiment, the dimension of the first substrate 1 on which the mirror is formed is 2 mm in length and 4 mm in width, and the thickness of the substrate is 300 $\mu$m. The torsion bar 22 has a sectional area of 15 $\mu$m×50 $\mu$m and a length of 500 $\mu$m. An electrode gap between the first substrate 1, on which the mirror face 11 is formed, and the second substrate 2, which is an electrode substrate, is 20 $\mu$m in a stationary state.

Figure 16:
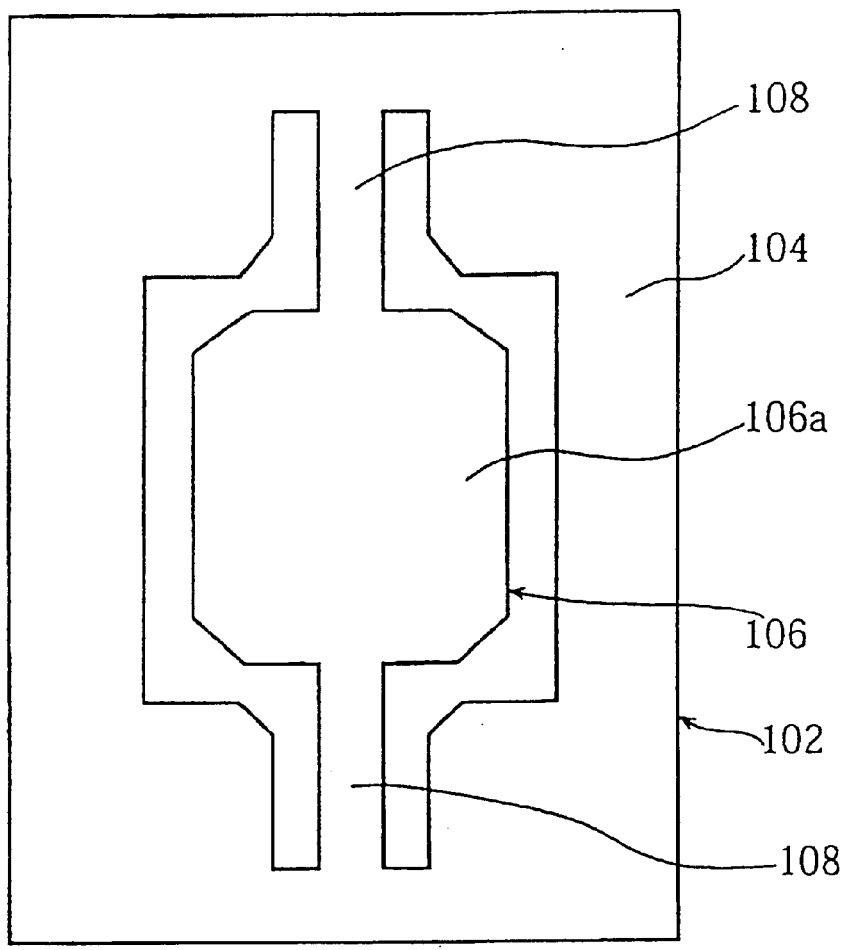
FIG. 16 is a plan view of a conventional typical GALVANO-micromirror.
Figure 17:
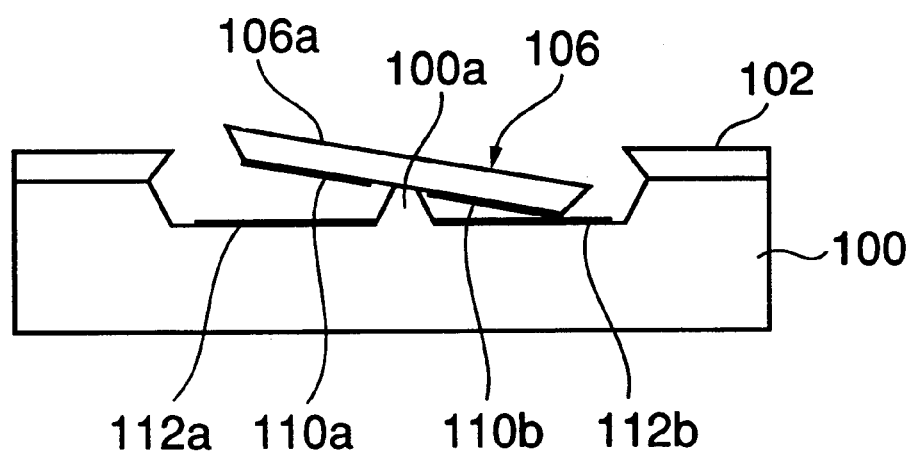
FIG. 17 is a sectional view of the conventional typical GALVANO-micromirror.

As compared with the conventional GALVANO-micromirror shown in FIG. 16, size reduction is realized in the GALVANO-micromirror shown in FIG. 8 because the torsion bar and the peripheral frame are hidden under the first substrate.

In the following description, explanation is given first of examples of the construction of the first and second substrates and then examples of the process of producing the individual substrates.

Construction of the First Substrate

FIGS. 1(a) and 1(b) are perspective views of a first substrate 1 of the GALVANO-micromirror according to the present invention, and FIG. 2 is a sectional view of the first substrate 1 taken along line A-B in FIG. 1.

FIG. 1(a) shows the configuration of a front face of the first substrate 1 and FIG. 1(b) shows the configuration of a back face of the first substrate 1.

In FIG. 1(a), there are formed on the first substrate 1 a mirror face 11 of a metal film having a high reflectance, drive electrodes 12 and 13 on both sides of the mirror face, and through holes 14 and 15 for electrical connection of these electrode 12 and 13 to a back side.

Here, for example, the size of the mirror face 11 is 1.8 mm (length in a lateral direction in the figure)×1.5 mm (length in a vertical direction in the figure) and the size of each of the electrodes 12 and 13 is about 1.8 mm (length in the lateral direction in the figure)×0.7 mm (length in the vertical direction in the figure).

In FIG. 1(b), a joint section 16 in a protrusive shape is formed in a central part of the back face of the first substrate 1, a recess 19 whose height is lower than the joint section 16 is formed around the joint section 16, and drive electrodes 12' and 13' are formed in part of the surface of the recess 19. Further, a separation trench 18 is formed to separate the recess 19 from a peripheral frame 17. Here, the size of the peripheral frame 17 is about 3.5 mm×6.5 mm, for example.

The separation trench 18 is about 350 $\mu$m wide and about 250 $\mu$m deep. The joint section 16 is about 0.8 mm×2 mm in size and about several micrometers higher than the recess 19. Through holes 14' and 15' are formed within the joint section 16.

The size of the electrodes 12' and 13' is the same as that of the electrodes 12 and 13 on the front face, respectively. The electrodes 12 and 12' are electrically connected to each other via the through holes 14 and 14', and the electrodes 13 and 13' are electrically connected to each other via the through holes 15 and 15'.

The mirror face 11 has a light-reflective film formed thereon, which may be formed of a metal material such as Cr, Au, Al or the like from the viewpoint of performance. The mirror face 11 may also be formed of a multi-layered dielectric film such as a laminate of $SiO_2$ or $TiO_2$ or a laminate of $Ta_2O_5$ and $SiO_2$ which does not modulate a polarizing property of the mirror face. The drive electrodes 12, 12', 13 and 13' and the through holes 14, 14', 15 and 15' may be formed of a metal material such as Cr, Au, Al or the like as the mirror face.

The first substrate 1 may be formed of a substrate of silicon, germanium or glass having a thickness of about 300 μm.

If this GALVANO-micromirror is driven with the electrodes on the front and back faces of the first substrate 1 being at an equal potential, the mirror face 11 and the electrodes 12 and 13 need not be formed separately, but the mirror face and the electrodes may be formed integrally. In this case, metal films may be formed on the entire front and back faces, and one through hole 14 is sufficient.

Further, if the GALVANO-micromirror is driven with the electrodes on the front and back faces of the first substrate 1 being at an equal potential, the entire front face of the first substrate 1 may be formed as a high-concentration impurity layer having low resistance and the first substrate itself may be used as an electrode. In this case, it is sufficient to form one through hole as well as a light-reflective film in a place to be the mirror face 11, and a pattern for the electrodes 12 and 13 and the like as shown in FIGS. 1(a) and 1(b) is unnecessary.

If a high-concentration impurity layer is used as a material for the first substrate 1 itself, then it is sufficient to form only a light-reflective film in the place to be the mirror face.

Construction of the Second Substrate

Now the construction of the second substrate is explained.

Figure 4:
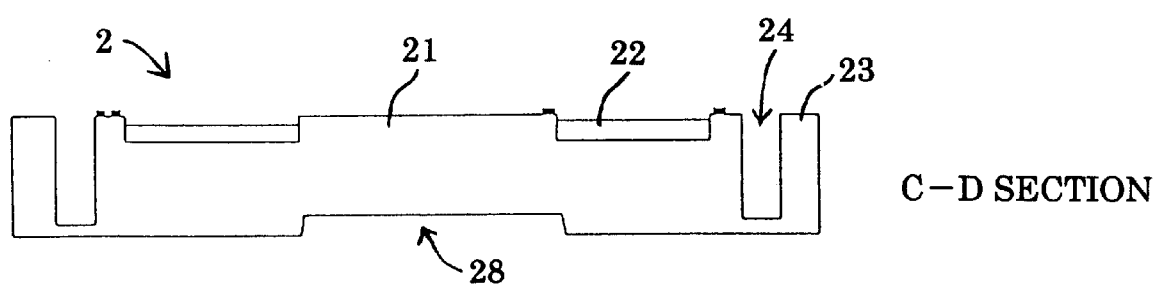
FIG. 4 is a sectional view of the second substrate of FIG. 3 taken along line C-D in FIG. 3.

FIGS. 3(a) and 3(b) are perspective views of a second substrate 2 of a GALVANO-micromirror according to the present invention, and FIG. 4 is a sectional view of the second substrate 2 taken along line C-D in FIG. 3(a).

FIG. 3(a) shows the configuration of a front face of the second substrate 2 and FIG. 1(b) shows the configuration of a back face of the second substrate 2.

In FIG. 3(a), a joint holder section 21 and elongated torsion bars 22 connected to the joint holder section 21 are formed in a central part of the front face of the second substrate 2. A recess 25 is formed around the joint holder section 21. Connection pads 26 and 27 are formed on the joint holder section 21, electrodes 31 and 32 are formed outside the recess 25, and a peripheral frame 23 and a separation trench 24 are formed in a periphery of the front face.

The electrodes 31 and 32 and the connection pads 26 and 27 are connected to external terminals 26', 27', 31' and 32' through a wiring pattern for external electrical connection. Here, a wiring pattern for connecting the connection pads 26 and 27 to external terminals runs along the top of the torsion bars 22.

In FIG. 3(b), a recess 28 is formed in a central part of the back face of the second substrate.

The joint holder section 21 is a region for joining to the joint section 16 of the first substrate 1, and its size is almost the same as the joint section 16 formed on the back face of the first substrate 1.

The connection pads 26 and 27 are formed on the joint holder section 21 and comes in electrical contact with the metal films 14' and 15', respectively, which are formed in the through holes of the first substrate 1. Their size may be about 500 μm×500 μm, for example.

The depth of the recess 25, in other words, the height of joint holder section 21 from the surface of the recess 25 is about 50 μm.

The recess 28 on the back face is a hollowed region opposite to the joint holder section 21 formed on the front face of the second substrate 2. The recess 28 is formed for raising the joint holder section 21 from the back face of the second substrate 2 to completely free the joint holder section 21 as described later. The size of the recess 28 may be about 1 mm (length in the lateral direction in the figure)×about 2.2 mm (length in the vertical direction in the figure) and the depth thereof may be about 50 μm.

In FIG. 3(a), the two torsion bars 22 are each formed in a rod shape of about 500 μm length, about 15 μm width and about 50 μm height. The top faces of the torsion bars 22 are about several micrometers lower than the top face of the joint holder section 21. This means that the joint holder section 21 contacts the joint section 16 of the first substrate 1 directly, but the torsion bars 22 do not contact the joint section 16.

The electrodes 31 and 32, the connection pads 26 and 27, the external terminals 26', 27', 31' and 32' and their wiring patterns may be formed of metal films of Cr, Au, Al or the like.

As the first substrate 1, the second substrate 2 may be formed of a semiconductor bulk substrate of silicon having a thickness of 300 μm.

Figure 5:
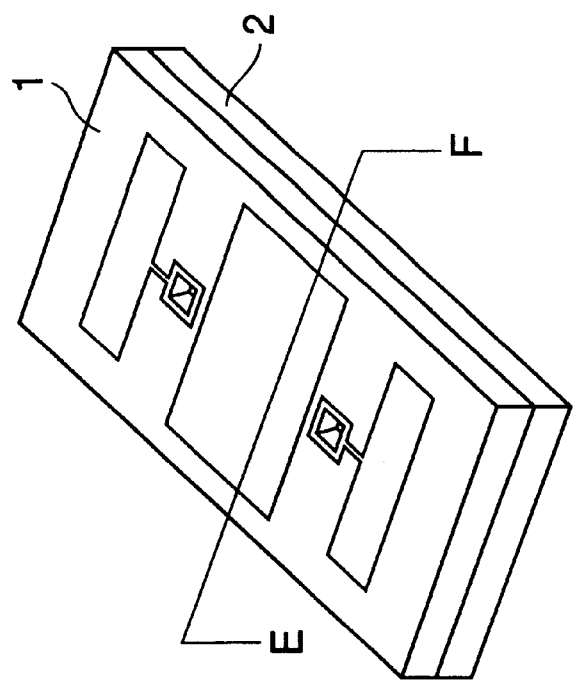
FIGS. 5(a) and 5(b) illustrate the joining of a first substrate and a second substrate of a GALVANO-micromirror in accordance with the present invention.
Figure 5:
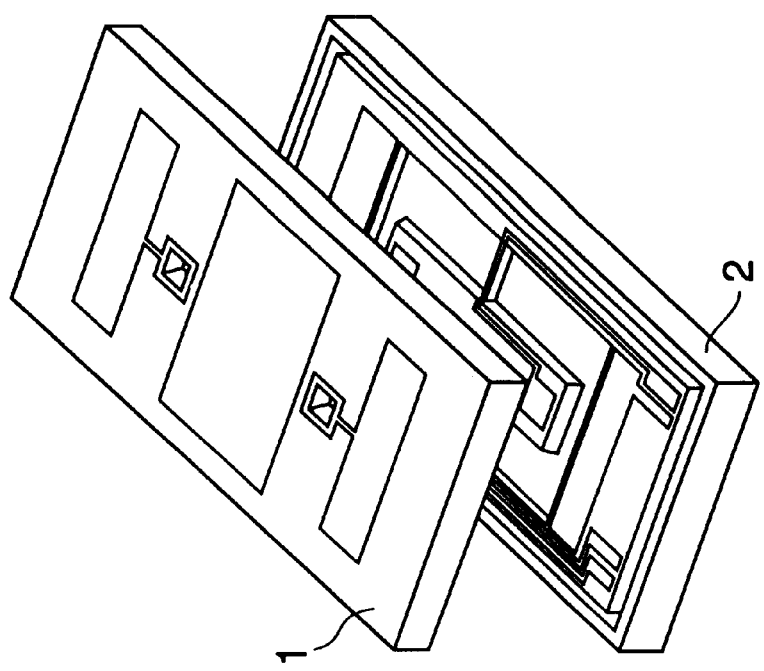

FIGS. 5(a) and 5(b) illustrate the joining of the first and second substrates 1 and 2 to each other.

FIG. 5(a) shows that the back face of the first substrate 1 is connected to the front face of the second substrate 2 with the first substrate 1 and the second substrate 2 being positioned so that the peripheral frame 17 of the first substrate 1 coincides with the peripheral frame 23 of the second substrate 2.

Figure 6:
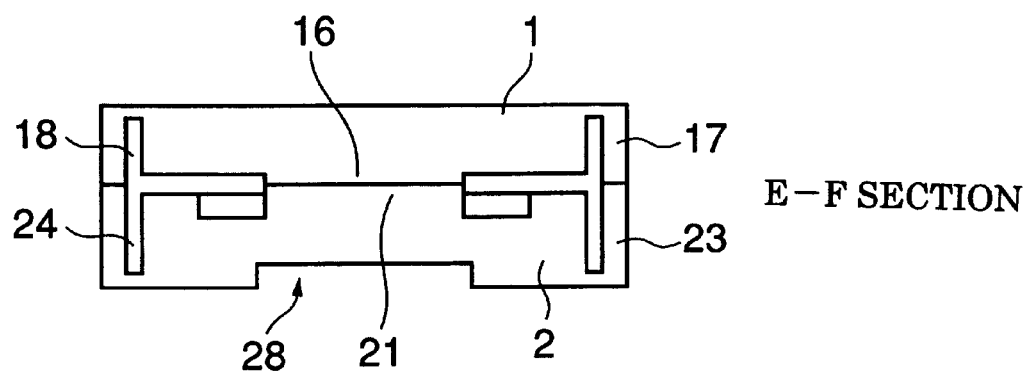
FIG. 6 is a sectional view taken along line E-F in FIG. 5(b)

FIG. 5(b) is a perspective view after both the substrates are joined to each other. FIG. 6 is a sectional view of the joined substrates taken along line E-F in FIG. 5(b). Here, it is understood that the first and second substrates contact each other by the peripheral frames 17 and 23 and the joint sections 16 and 21.

Production Process of First Substrate

FIGS. 9(a) to 9(f) and FIGS. 10(g) to 10(l) illustrate a process of producing the first substrate 1 of the GALVANO-micromirror shown in FIGS. 1(a) and 1(b).

Figure 9:
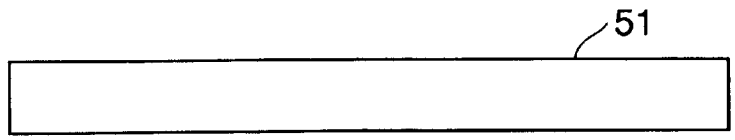
FIGS. 9(a) to 9(f) illustrate a process of manufacturing a first substrate of a GALVANO-micromirror in accordance with the present invention.
Figure 9:
Figure 9:
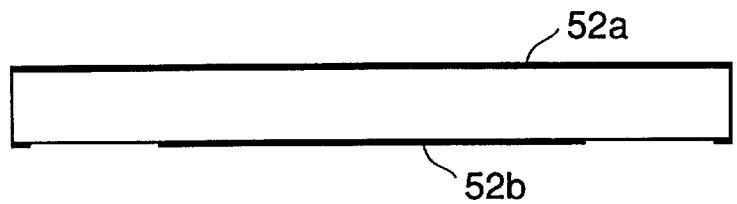
Figure 9:
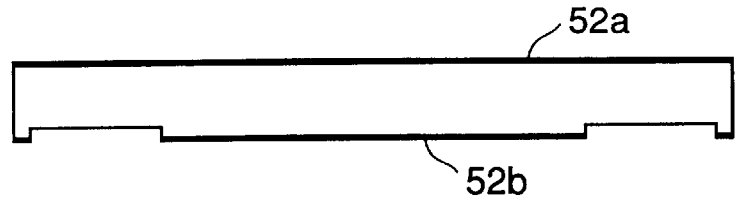
Figure 9:
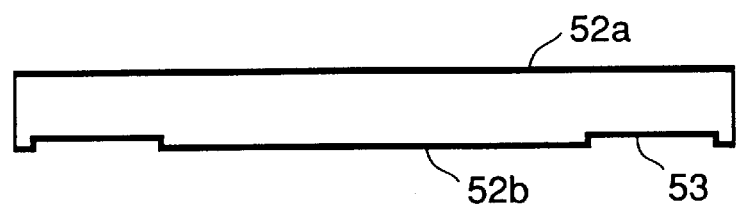
Figure 9:

FIG. 9(a) shows a silicon wafer (1, 0, 0) 51 which is a substrate for the first substrate 1. Here, the silicon wafer is 300 μm thick.

In FIG. 9(b), uniform oxide films (SiO$_2$) 52a and 52b are formed to a thickness of about 1.0 to 1.2 μm all over the front and back faces of the wafer 51 by placing the wafer 51 in an atmosphere of oxygen gas and vapor (3 L/min.) at 1,100° C.

Subsequently, in FIG. 9(c), a resist film is formed on the oxide film 52b in the center of the back face of the wafer 51. The oxide film 52b is removed by etching fully from a region not covered with the resist film. This region corresponds to the recess 19 on the back face of the first substrate 1.

A mixture liquid of hydrofluoric acid, ammonium fluoride and water is used as an etching liquid.

Next, in FIG. 9(d), silicon is etched to a depth of about 15 μm in the region where the oxide film 52b has been removed, with use of a 20 to 35 w % aqueous solution of KOH as an etching liquid. Thereby, the recess 19 and the joint section 16 are formed on the back face of the first substrate.

In FIG. 9(e), another oxide film is formed on the entire back face under the same conditions as used in FIG. 9(b). At this time, an oxide film 53 of about 1.2 μm thickness is formed in the region where silicon has been etched.

In FIG. 9(f), for preparing for formation of the peripheral frame 17, separation trench 18 and through holes 14' and 15' on the back face, a resist film is formed and the oxide films 52b and 53 are removed by etching from regions not cover with the resist film.

Here, etching conditions may be the same as used in FIG. 9(c).

Figure 10:
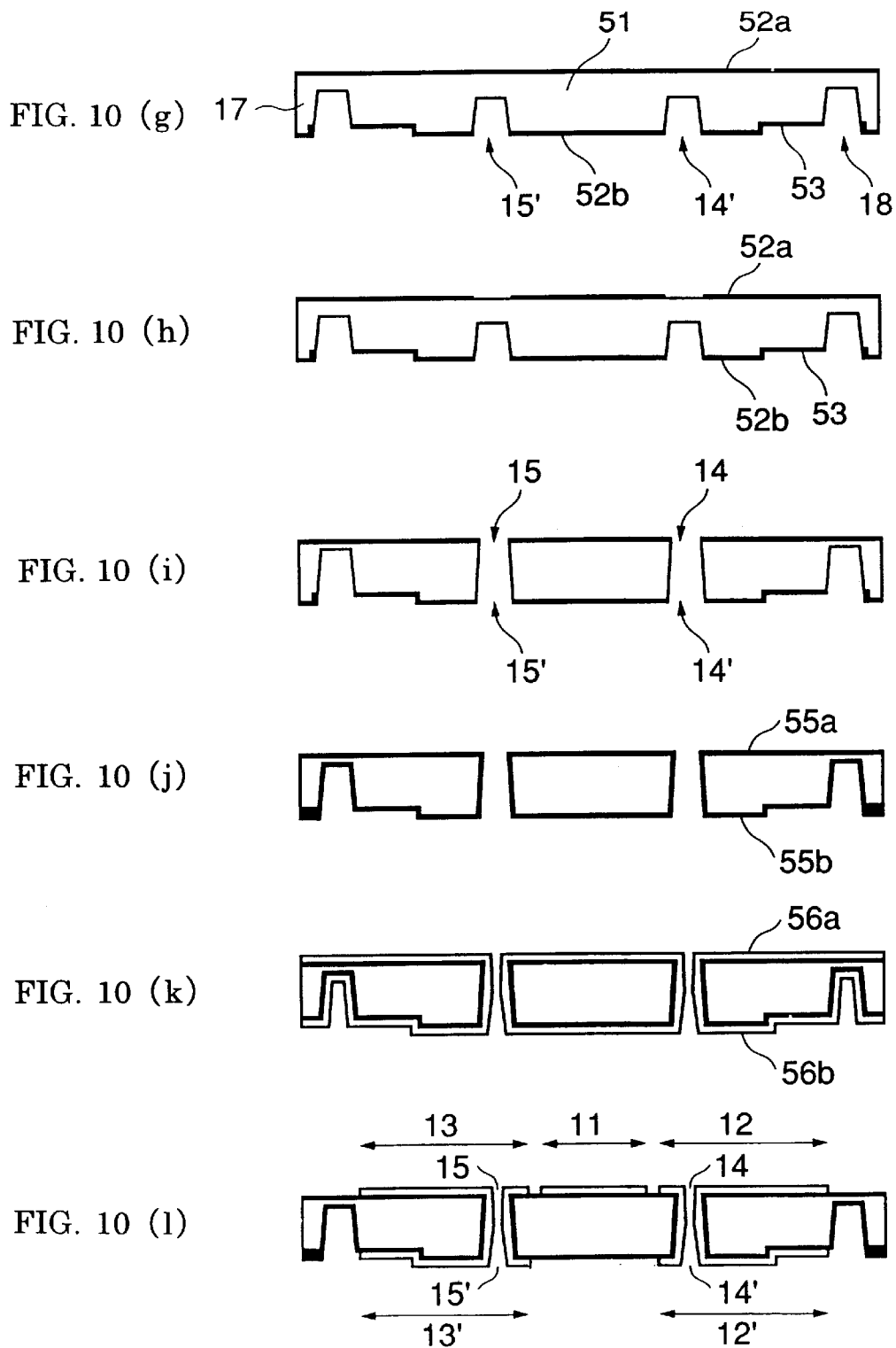
FIGS. 10(g) to 10(l) illustrate a process of manufacturing the first substrate of the GALVANO-micromirror in accordance with the present invention.

In FIG. 10(g), silicon is etched to a depth of about 220 μm in the regions where the oxide films 52b and 53 have been removed, with use of a 20 to 35 w % aqueous solution of KOH as an etching liquid. Thereby, the peripheral frame 17 and the separation trench 18 are formed on the back face, and recesses are formed at positions 14' and 15' to be the through holes 14' and 15'. The separation trench 18 has a depth of 220+15=235 μm relative to the back face of the initial wafer 51.

In FIG. 10(h), the oxide film 52a on the front face of the wafer 51 is removed by etching for forming through holes 14 and 15. Here, a resist film for the through holes is formed in regions other than the through holes 14 and 15, and thereafter, the oxide film is removed from the regions of the through holes 14 and 15 by etching, under the same conditions as in FIG. 9(c).

In FIG. 10(i), silicon is etched to a depth of about 40 μm to form the through holes 14 and 15 which go through from the front face to the back face. Here, the same etching liquid as used in FIG. 10(g) may be used as silicon etching liquid. At this time, the separation trench 18 becomes 275 μm deep, and the peripheral frame 17 is connected to an inside of the substrate by portions of about 25 μm thick.

In FIG. 10(j), oxide films 55a and 55b of about 1.2 μm thickness are formed on the entire front and back faces of the resulting wafer 51. Conditions of forming the oxide films may be the same as in FIG. 9(b). At this time, oxide films are formed on sidewalls of the separation trench 18 and the through holes 14 and 15.

In FIG. 10(k), metal films 56a and 56b are formed on the oxide films 55a and 55b on the entire front and back faces, for example, by sputtering. The metal films are each formed in a two-layered structure of a Cr film having a thickness of 50 nm and a Au film having a thickness of 200 nm. At this time, the metal film is also formed within the through holes 14 and 15.

In FIG. 10(l), a resist pattern is formed so that the metal films 56a and 56b remain in predetermined regions, and then the metal films are removed by etching. For example, a mixture of iodine and an aqueous solution of potassium iodide is used as an etching liquid for the Au film and a mixture of ammonium ceric nitrate and an aqueous solution of perchloric acid is used as an etching liquid for the Cr film. Thus, the metal films are formed which are to be the mirror face 11, the electrodes 12, 12', 13 and 13', and through holes 14, 14', 15 and 15' as shown in FIGS. 1(a) and 1(b).

By the above described process shown in the FIGS. 9(a) to 9(f) and FIGS. 10(g) to (l), the first substrate 1 before joined is formed.

Production Process of Second Substrate

FIGS. 11(a) to 11(f) and FIGS. 12(g) to 12(l) illustrate a process of producing the second substrate of the GALVANO-micromirror shown in FIGS. 3(a) and 3(b).

Figure 11:
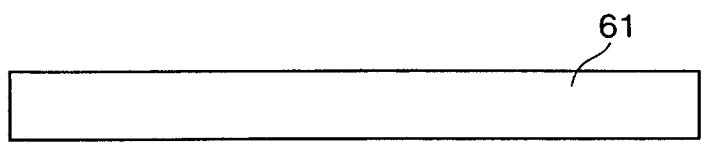
FIGS. 11 (a) to 11(f) illustrate a process of manufacturing a second substrate of a GALVANO-micromirror in accordance with the present invention.
Figure 11:
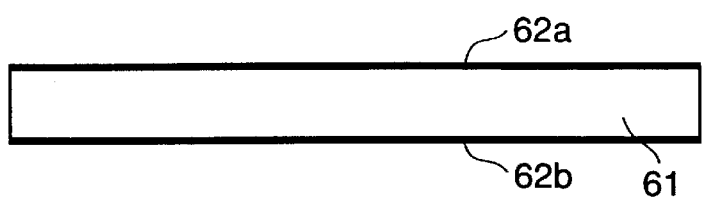
Figure 11:
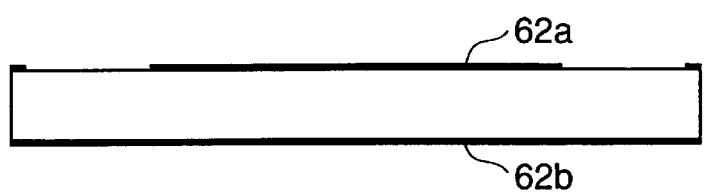
Figure 11:
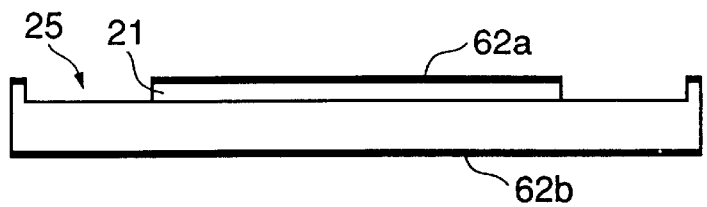
Figure 11:
Figure 11:

FIG. 11(a) shows a silicon wafer (1, 0, 0) 61 which is a substrate for the second substrate 2.

In FIG. 11(b), oxide films 62a and 62b are formed to a thickness of about 1.2 μm all over front and back faces of the wafer 61 under the same conditions as in FIG. 9(b).

In FIG. 11(c), a resist pattern is formed on the oxide film 62a in the center of the front face of the wafer 61. The oxide film 62a is removed by etching from a region not covered with the resist pattern. Etching conditions may be the same as in FIG. 9(c).

Subsequently, in FIG. 11(d), silicon is etched to a depth of about 5 μm to form the joint holder section 21 and the recess 25 of FIG. 3(a). The same etching liquid as used in FIG. 9(d) may be used in this step.

In FIG. 11(e), another oxide film is formed on the entire front face of the second substrate 2 under the same conditions as in FIG. 11(b). At this time, an oxide film 63 of about 1.2 μm thickness is formed in the recess 25.

In FIG. 11(f), a resist pattern is formed for the formation of the peripheral frame 23 and separation trench 24 as shown in FIG. 3(a), and the oxide film 63 is removed by etching from a region not covered with the resist pattern. Etching conditions in this step may be the same as in FIG. 9(f).

Figure 12:
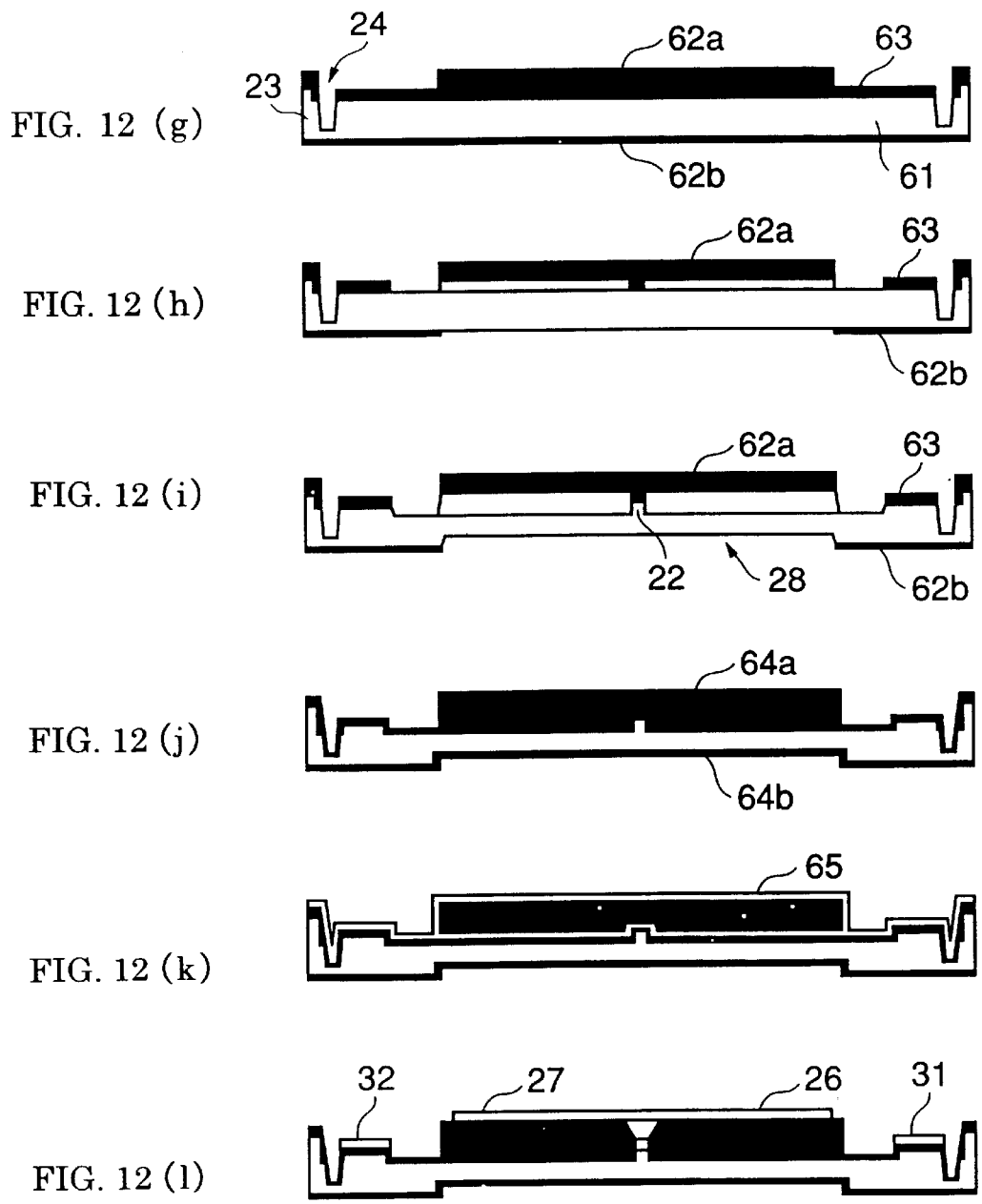
FIGS. 12(g) to 12(l) illustrate a process of manufacturing the second substrate of the GALVANO-micromirror in accordance with the present invention.

In FIG. 12(g), silicon is etched to form the peripheral frame 23 and the separation trench 24. The same etching liquid as in FIG. 10(g) may be used. Here, the depth of the separation trench is such that it will be about 275 μm finally after later steps.

In FIG. 12(h), a resist pattern is formed for the formation of the torsion bar 22 on the front face of the wafer 61 and the recess 28 on the back face of the wafer 61, and the oxide film is removed by etching from a region not covered with the resist pattern. The same conditions as in FIG. 11(b) may be used in this step.

In FIG. 12(i), silicon is etched in the region where the oxide film has been removed. Etching conditions may be the same as in FIG. 11(g). Here the depth of etching is about 50 μm on the front and back faces. The torsion bar 22 (of 50 μm height) and the recess 28 are thus formed on the front face and on the back face, respectively.

In FIG. 12(j), oxide films 64a and 64b of about 1.2 μm thickness are formed on the entire front and back faces of the wafer 61. The same conditions as in FIG. 11(b) may be used in this step.

In FIG. 12(k), a metal film 65 is formed on the entire front face, for example, by sputtering. The metal film is formed in a two-layered structure of a Cr film having a thickness of 50 nm and a Au film having a thickness of 200 nm, like the metal film formed on the first substrate.

In FIG. 12(l), a resist pattern is formed for patterning the metal film 65 in the configuration shown in FIG. 3(a), and the metal film 65 is removed by etching from a region not covered with the resist pattern.

By this etching of the metal film, the electrodes 31 and 32, the connection pads 26 and 27, the connection terminals 26', 27', 31' and 32' and wiring patterns for connection of the connection terminals and the connection pads are formed on the front face of the wafer 61.

By the above-described process, the first and the second substrates are produced. It is noted, however, that the etching of silicon may be performed not only by etching under the above-mentioned conditions but also by wet etching using other aqueous alkali (e.g., ethylenediamine and a pyrocatechol solution, TMAH (an aqueous solution of tetramethylammonium), etc.) or by dry etching using a RIE apparatus (including DRIE). Also, the metal film may be not only a Cr/Au film but also an Al film, and may be formed by deposition as well as by sputtering.

In the above-described process, the etch depth in FIG. 9(d) is 15 μm and that in FIG. 11(d) is 5 μm. However, this combination of depths is not limitative one. It suffices that the sum of the etch depths in FIG. 9(d) and FIG. 11(d) equals a desired electrode spacing (i.e., a gap indicated by a in FIG. 7(b)), e.g., 20 μm.

Joint of First and Second substrates

The thus produced first substrate 1 and second substrate 2 are joined to each other in alignment such that the back face of the first substrate 1 contacts the front face of the second substrate 2, as shown in FIGS. 5(a) and 5(b). This joint may be performed by the following known techniques, for example:

(1) bonding with an electroconductive adhesive;
(2) anodic bonding;
(3) high-temperature contact bonding;
(4) silicide formation bonding via a Au film;
(5) bonding by applying a low-melting electroconductive glass between the substrates and melting the glass; and
(6) boding with a small amount of low-concentration aqueous HF.

Among the above-mentioned, (1), (4) and (5) are especially preferable because the first and second substrate already have the patterned metal films thereon and therefore it is desirable not to expose them to high temperatures.

Figure 7:
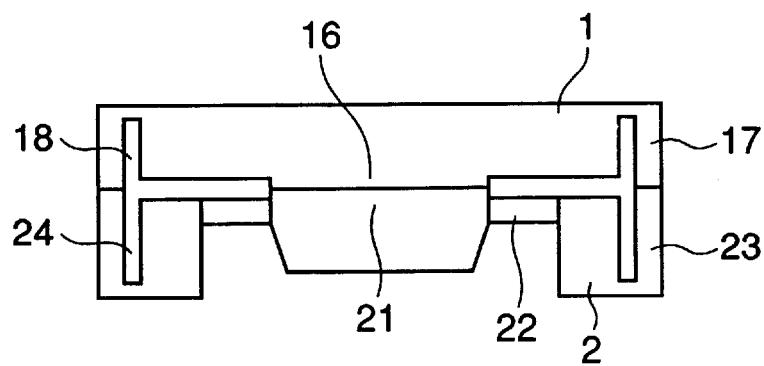
FIGS. 7(a) and 7(b) are sectional views taken along line E-F in FIG. 5(b) illustrating a process of separating a peripheral frame after the first and second substrates are joined in accordance with the present invention.
Figure 7:
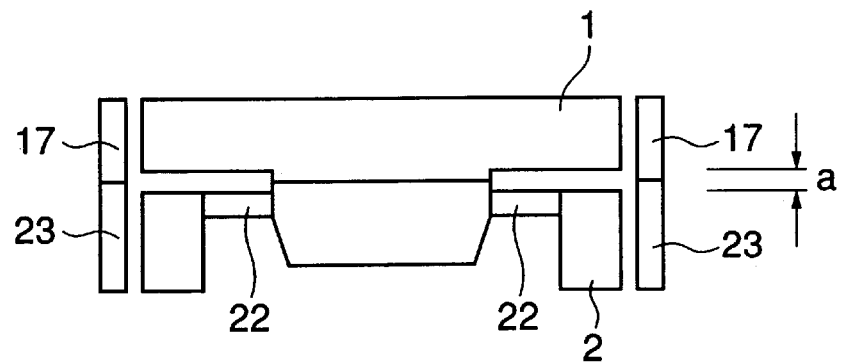

FIGS. 7(a) and 7(b) are sectional views of the joined substrates after the process of separating the recess 28 of the second substrate and the peripheral frames is carried out on the joined substrates shown in FIGS. 5(a) and 5(b).

Both FIGS. 7(a) and 7(b) are sectional views taken along line E-F of FIG. 5(b).

FIG. 7(a) shows a structure in which a bottom face of the second substrate, i.e., a part of the second substrate on the back face, is removed from the structure shown in FIG. 6 by the step of separating the recess 28. Thereby, the recess 28 is opened, and the joint holder section 21 formed in the second substrate and the first substrate joined to the joint holder section 21 are connected to a base of the second substrate 2 having the electrode 31 and 32, only via the torsion bars 22. In this separating step, dry etching may be used.

FIG. 7(b) shows a state in which the peripheral frames 17 and 23 in the structure shown in FIG. 7(a) are further separated by removing a part of the substrates of about 25 µm thickness remaining above and below the separation trenches 18 and 24.

FIG. 8 is a perspective view of a completed GALVANO-micromirror after the peripheral frames 17 and 23 are separated in FIG. 7(b).

By the above-described production process, is produced the GALVANO-micromirror in which the mirror face 11 formed on the joint sections 16 and 21 is supported only by the two torsion bars 22, which are formed under the mirror face 11.

Here, in the conventional micromirror of FIG. 16, given that the width of its mirror face 106a is 2 mm, the length of torsion bars 108 is about 500 µm×2=1 mm (in the vertical direction in the figure) and the width of the peripheral frames is about 500 µm×2=1 mm, the micromirror is required to have a total width (length in the vertical direction in the figure) of at least 4 mm. On the other hand, in the micromirror of the present invention, the total width is reduced by half to about 2 mm, which is substantially equal to the width of the mirror face. Consequently, the present invention can realize significant size reduction as compared with the conventional micromirror and can also realize a micromirror having substantially the minimum width which is determined by the required minimum size of the mirror face.

Further, since the mirror face is formed on the silicon substrate of about 300 µm thickness, the mirror face is considered to retain the patterning accuracy of the silicon substrate, even though slight residual stress is generated at the formation of the metal film. Consequently, high flatness is maintained.

Another Embodiment

FIGS. 13(a) and 13(b) illustrate the construction of a GALVANO-micromirror in accordance with another embodiment of the present invention.

FIG. 13(a) is an overall perspective view, and FIG. 13(b) is a sectional view taken along line G-H in FIG. 13(a).

Here, a mirror face 74 and torsion bars 81 and 82 are formed in a single silicon substrate, and the torsion bars 81 and 82 are formed in a recess provided in the mirror face 74. When seen from above the substrate, the torsion bars 81 and 82 are not hidden under the mirror face 74, but exposed at substantially the same level as the mirror face 74. A peripheral frame 71 of the silicon substrate is outside the mirror face 74 and is connected to a mirror section 72 having the mirror face 74 formed thereon by the torsion bars 81 and 82.

As being clearly understood from FIGS. 13(a) and 13(b), the torsion bars 81 and 82 are formed in two recesses within the mirror face in this example. Accordingly, as compared with the conventional micromirror, the micromirror of this example can be reduced in the total width of the substrate by about 1 mm which is equivalent to the sum of the lengths of two torsion bars. However, since the recesses are provided in the mirror face 74, some loss in quantity of light takes place.

In FIGS. 13(a) and 13(b), if the width of the torsion bars 81 and 82 is 15 µm, the torsion bars 81 and 82 are separated from the mirror face 74 by gaps of 15 µm width on both sides of the torsion bars and the length of the torsion bars 81 and 82 is 500 µm, the area of the recesses in the mirror face 74 is 45 µm×500 µm×2=0.045 mm². That is, the area of the recesses occupies only about 1.5% of the area of the mirror face 74 (e.g., 1.5 mm×2.0 mm=3.0 mm²). With such a proportion, the loss in the quantity of light caused by the provision of the torsion bars 81 and 82 in the recesses can be almost neglected.

In FIGS. 13(a) and 13(b), electrodes 73 and 75 on the front face correspond to the electrodes 12 and 13 of FIG. 1(a), and electrodes 83 and 84 on the back face correspond to the electrodes 12' and 13' of FIG. 1(b). Through holes 78 and 79 are provided between the mirror face 74 and the electrodes 73 and 75, and the electrodes 73 and 75 are electrically connected to the electrodes 83 and 84 on the back face via the through holes 78 and 79. For external connection, wires 76 and 77 are formed from the mirror face 74 along the torsion bars 81 and 82 as shown in FIG. 13(a).

FIGS. 14(a) to 14(f) and FIGS. 15(g) to 15(k) illustrate a process of manufacturing the GALVANO-micromirror substrate of FIGS. 13(a) and 13(b).

FIGS. 14(a) to 14(f) are sectional views taken along line J-K in FIG. 13(a) and FIGS. 15(g) to 15(k) are sectional views taken along line G-H in FIG. 13(a).

Figure 14:
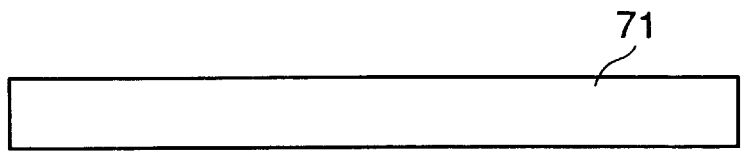
FIGS. 14(a) to 14(f) illustrate a process of manufacturing the GALVANO-micromirror of the present invention shown in FIGS. 13(a) and 13(b)
Figure 14:
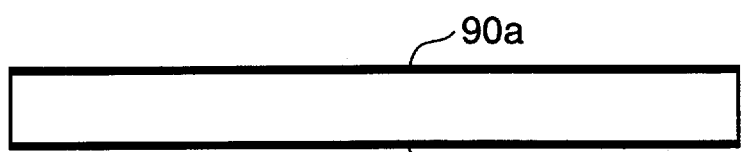
Figure 14:
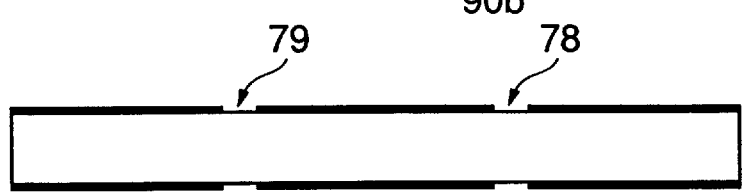
Figure 14:
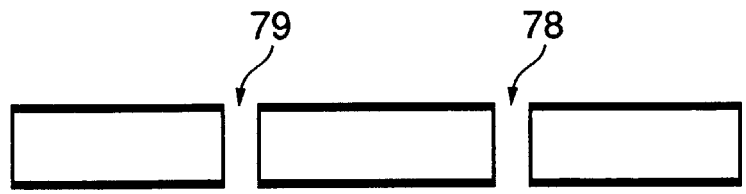
Figure 14:
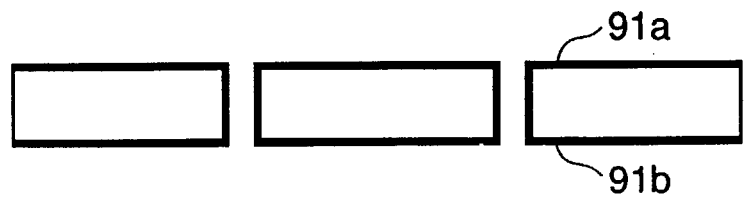
Figure 14:
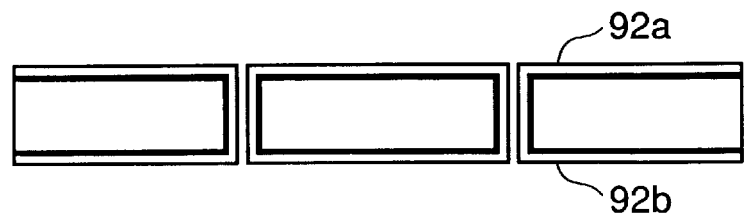

FIG. 14(a) shows a silicon wafer (1, 0, 0) which is to be the substrate 71 of FIGS. 13(a) and (b). The silicon wafer is 300 µm thick.

In FIG. 14(b), uniform oxide films 90a and 90b are formed on the entire front and back faces of the wafer 71. Here, the conditions of forming the oxides films may be the same as in FIG. 9(b). Thereby oxides film of about 1.2 µm thickness are formed.

In FIG. 14(c), resist patterns are formed for the formation of the through holes 78 and 79, and the oxides films 90a and 90b are removed by etching from regions not covered with the resist patterns. Etching conditions may be the same as in FIG. 9(c). Here the regions where the oxide films are removed are regions to be the through holes 78 and 79.

In. FIG. 14(d), silicon is etched to form the through holes 78 and 79. Here, the same etching liquid as in FIG. 9(d) is used.

In FIG. 14(e), oxide films 91a and 91b are formed on the entire front and back faces of the substrate. Conditions of forming the oxide films may be the same as in FIG. 14(b).

In FIG. 14(f), metal films 92a and 92b are formed on the entire front and back faces by sputtering. The metal films 92a and 92b are formed of the same material (Cr/Au) of the same thickness as formed in FIG. 10(k).

Figure 15:
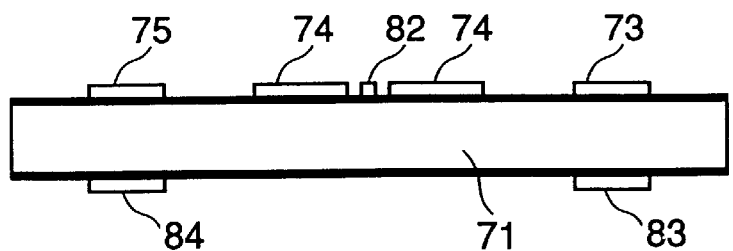
FIGS. 15(g) to 15(k) illustrate a process of manufacturing the GALVANO-micromirror of the present invention shown in FIGS. 13(a) and 13(b)
Figure 15:
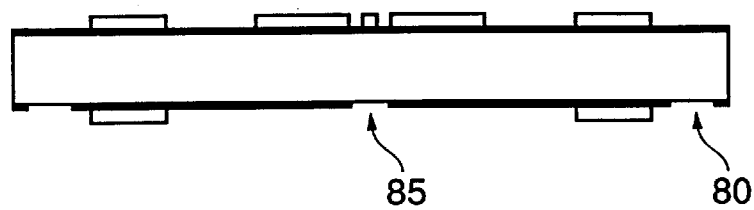
Figure 15:
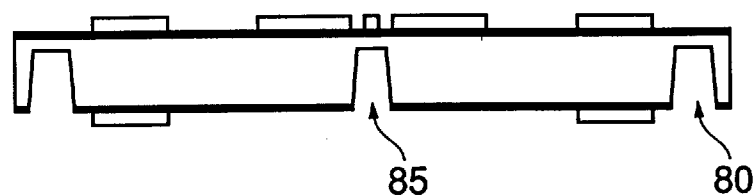
Figure 15:
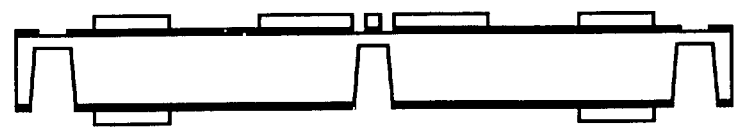
Figure 15:

In FIG. 15(g), a resist pattern is formed for forming the metal films into required configurations for the electrodes shown in FIGS. 13(a) and 13(b), and then the metal films 92a and 92b are etched. Etching conditions may be the same as in FIG. 10(l). By this etching, are formed the electrodes 72, 75, 83 and 85, the mirror face 74, wires 81, 82, 76 and 77 on the torsion bars and metal films in the through holes 78 and 79 of FIGS. 13(a) and 13(b).

In FIG. 15(h), the oxide film on the back face is etched for forming a separation trench 80 and a trench under the torsion bars. Here, a resist pattern is formed to cover regions other than predetermined regions, and the oxide film is removed by etching from the regions not covered with the resist pattern. Etching conditions may be the same as in FIG. 14(c).

In FIG. 15(i), silicon in the regions from which the oxide film is removed is etched to a depth of about 250 μm under the same conditions as in FIG. 14(d). By this etching, the separation trench 80 and the trench 85 under the torsion bars are formed.

In FIG. 15(j), the oxide film on the front face is removed by etching for forming the torsion bars 81 and 82 and opening the separation trench 80. Here, a resist pattern is formed to cover regions other than predetermined regions on the front face, and the oxide film is removed by etching from the regions not covered with the resist pattern. Etching conditions may be the same as in FIG. 14(c).

In FIG. 15(k), silicon is etched in the regions from which the oxide film has been removed. Here silicon is etched to a depth of 50 μm by dry etching using a DRIE apparatus so that the trench under the torsion bars can be formed to have as small a width as possible. By this etching, the separation trench 80 and regions on both sides of the torsion bars 81 and 82 are bored through. Thus the GALVANO-micromirror of the embodiment as shown in FIGS. 13(a) and 13(b) is completed.

This embodiment is characteristic in that the production process is greatly simplified since the GALVANO-micromirror is produced of a single substrate.

According to the present invention, since the torsion bars are formed under the mirror face or in a part of the mirror face, it is possible to reduce the size of the GALVANO-micromirror while maintaining the desired performance of the GALVANO-micromirror. Further, with the size reduction of the GALVANO-micromirror, it is also possible to reduce the size of an optical disk driving device using this GALVANO-micromirror.

What is claimed is:

1. A GALVANO-micromirror comprising:
    a first substrate having a light-reflective mirror face on one surface thereof and a first electrode on one or both surface(s) thereof; and
    a second substrate including a frame-form base, a second electrode located oppositely to the first electrode, a joint holder section located under the mirror face for holding the first substrate, and a torsion bar section located under the mirror face for connecting the frame-form base to the joint holder section and supporting the joint holder section pivotally within a range of angles,
    wherein a part of a surface of the first substrate on which the mirror face is not formed is joined to the joint holder section of the second substrate.

2. The GALVANO-micromirror according to claim 1, wherein the first and second substrates are formed of semiconductor bulk substrates.

3. A process for manufacturing a GALVANO-micromirror comprising the steps of:
    forming a mirror face of a light-reflective film on one surface of a first substrate made of a semiconductor bulk substrate, a first electrode of a metal thin film on one surface or first electrodes of thin metal films on both surfaces of the first substrate, and a joint section in a protrusive form on a surface on which the mirror face is not formed;
    forming, on one surface of a second substrate made of a semiconductor bulk substrate, a second electrode opposed to the first electrode(s), a joint holder section in a protrusive form for holding the first substrate, and a torsion bar section for pivotally supporting the joint holder section within a range of angles;
    forming a peripheral frame and a separation trench for separating the peripheral frame from the first substrate, on a surface of the semiconductor bulk substrate forming the first substrate on which surface the mirror face is not formed;
    forming a peripheral frame and a separation trench corresponding to the peripheral frame and the separation trench formed on the first substrate, on the surface of the semiconductor bulk substrate forming the second substrate on which surface the joint holder section is formed; and
    joining the first and second substrates so that the joint section of the first substrate contacts the joint holder section of the second substrate and thereafter boring the trenches through, thereby separating the substrates from the peripheral frames.

4. The process according to claim 3, wherein, in the case where the first electrodes are formed on both surfaces of the first substrate, a through hole is formed in the first substrate for electrical connection of the first electrodes on both surfaces.

* * * * *